No. 799,663. PATENTED SEPT. 19, 1905.
I. S. NEWTON.
BELT SHIFTER.
APPLICATION FILED JUNE 26, 1905.
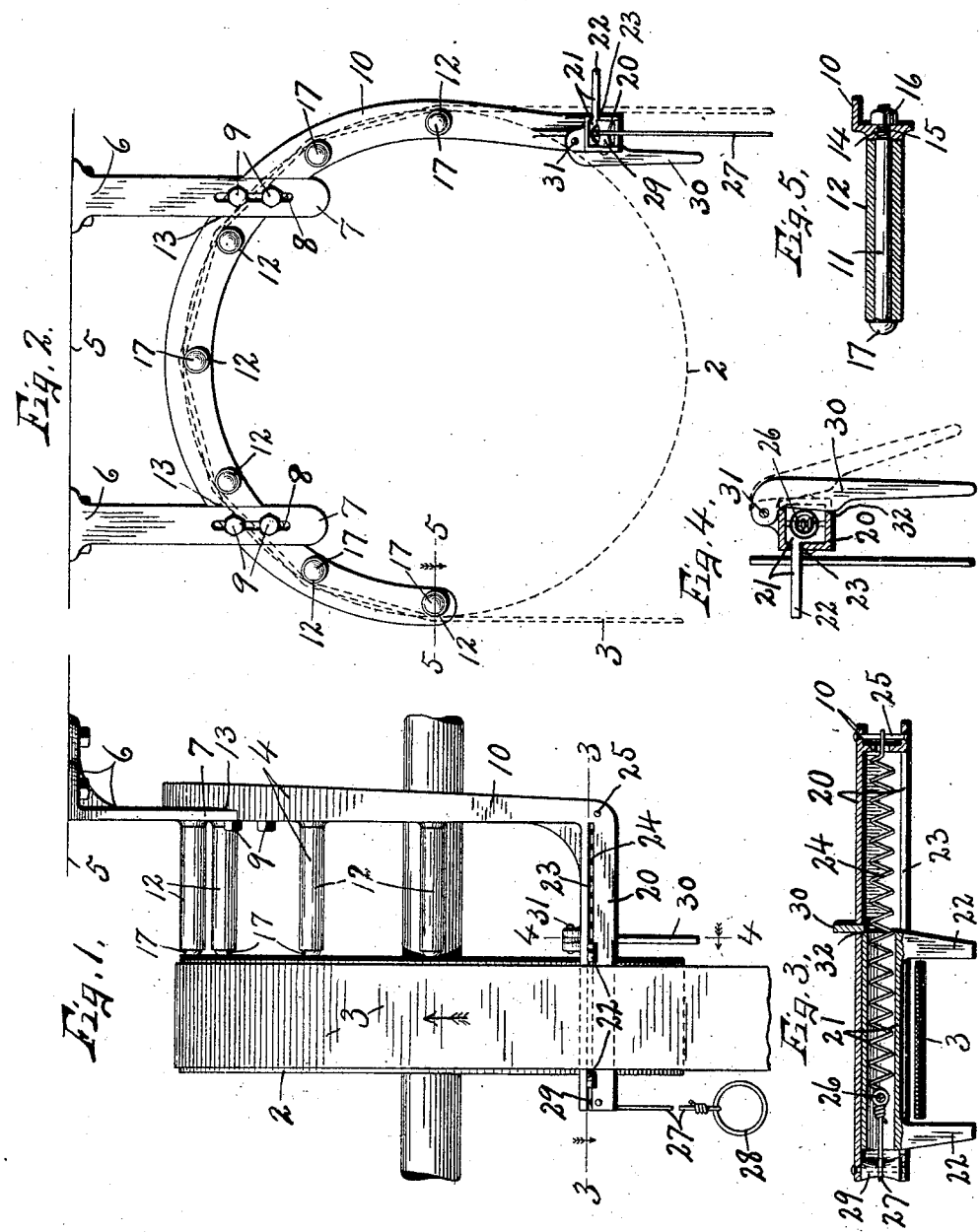
WITNESSES:
B. E. Robinson
H. E. Chase
INVENTOR:
Isaac S. Newton
BY:
Howard P. Denison
ATTORNEY.

UNITED STATES PATENT OFFICE.

ISAAC S. NEWTON, OF SYRACUSE, NEW YORK, ASSIGNOR OF ONE-HALF TO FRANK CARLTON, OF SYRACUSE, NEW YORK.

BELT-SHIFTER.

No. 799,663.     Specification of Letters Patent.     Patented Sept. 19, 1905.

Application filed June 26, 1905. Serial No. 267,107.

*To all whom it may concern:*

Be it known that I, ISAAC S. NEWTON, of Syracuse, in the county of Onondaga, in the State of New York, have invented new and useful Improvements in Belt-Shifters, of which the following, taken in connection with the accompanying drawings, is a full, clear, and exact description.

This invention relates to improvements in belt-shifters, and refers more particularly to that class in which a belt is shifted from a revolving pulley onto a stationary support containing a series of rollers concentric with the pulley-axis, so that the belt is at rest when not in use.

I am aware that it is not new to employ rollers upon a stationary frame located at the side of a pulley upon which the belt may be shifted from the pulley, such a device being shown in Patent No. 430,345, June 17, 1890, Jackson *et al.*

In many instances it is necessary to locate a series of pulleys upon the same shaft in close proximity to each other, and therefore the space available for shifting the belt or belts is necessarily very much restricted, and it would be quite impossible to operate a shifting-lever or shifting mechanism like that seen in the patent above referred to, and while my invention is similar in some respects to the device set forth in this patent, yet I have sought to simplify the general structure of the belt holder and shifter and at the same time to adapt it for use on shafts where several pulleys are arranged in close proximity.

My object, therefore, is to produce a vertically-adjustable belt-hanger and to provide it with a simple shifting mechanism all the parts of which are located within substantially the combined width of the pulley and belt-hanger, thereby avoiding the use of hand shift-levers and allowing the shifting mechanism to be operated even when the pulleys are arranged close together upon the shaft.

It is well understood that in shifting a belt from a fixed hanger or from a loose pulley onto a revolving tight pulley it is only necessary to partially engage the edge of the belt with the revolving pulley, whereupon the belt will be automatically drawn onto the pulley as soon as the belt begins to move, the reasons for which are clearly understood by those skilled in the art of belt-power transmission, and it will therefore be unnecessary to further explain the reasons why the belt will assume its proper place upon the revolving pulley. On the other hand, it is more difficult to shift the belt from a revolving pulley onto a fixed belt-hanger, and one of the objects of my invention is to provide automatic means for locking the belt-shifting mechanism in position to hold the belt on the revolving pulley and to provide additional means operating automatically upon the shifting mechanisms to shift the belt from the revolving pulley onto the stationary belt-hanger.

Other objects relating to the specific construction of the belt hanger and shifter will be brought out in the following description.

In the drawings, Figures 1 and 2 are respectively a face view and end view of my improved belt hanger and shifting mechanism, showing also in Fig. 1 a shaft and tight pulley thereon in its proper relation to the belt-hanger. Fig. 3 is a sectional view taken on line 3 3, Fig. 1. Figs. 4 and 5 are sectional views taken, respectively, on line 4 4, Fig. 1, and 5 5, Fig. 2.

In order to demonstrate the practicability of my invention, I have shown a revoluble shaft 1, upon which is mounted a tight pulley 2, carrying a belt 3, to which motion is transmitted by the revolving pulley 2. I have shown part of a line-shaft 1, which is usually located near the ceiling of a room, and I have therefore shown a belt-hanger 4 as suspended from the ceiling 5 by suitable brackets or hangers 6, having depending arms 7, which are provided with vertical slots 8 for receiving one or more clamping-bolts 9. The hanger 4 consists, essentially, of a substantially semicircular malleable or cast-iron segment 10, having a semicircular row of laterally-projecting studs 11, upon which are mounted tubular sleeves or rollers 12.

The semicircular segment 10 is located about the width of the belt distant from one end of the pulley 2, concentric with the axis of the shaft 1 and of substantially the same diameter as the pulley 2, the lower side of said segment being open to permit it to be readily placed upon the hangers 7, and in order that it may be more firmly held in position the segment is provided with recesses 13, which receive and closely fit against opposite edges of the depending arms 7, said segment being further held in place by the bolts 9, which enter threaded apertures in said segment, the slots 8 permitting slight vertical adjustment of the belt-hanger to bring the rollers 12 into proper registration or alinement with the face of the pulley.

The studs 11 are arranged in a semicircular row between the segment 10 and adjacent face of the pulley 2 and parallel with the axis of the shaft 1, each of said studs having a reduced threaded end 14, which is inserted through its corresponding aperture 15 in the segment 10 and is held in place by the clamping-nut 16. The opposite ends of these studs 11 adjacent to the pulley 2 are each provided with a round head 17 to permit the belt to ride easily upon the rollers 12, which are mounted upon the studs 11 between the segment 10 and head 17, said rollers having their outer faces disposed in a semicircular plane substantially coincident with the face of the pulley.

One end of the segment 10 is extended downwardly some distance below the other end and is provided with a laterally-projecting box-shaped guide 20, which extends across the face of the pulley just inside of the belt for receiving and supporting a hollow shift-bar 21, having shifting-arms 22 projecting through a slot 23 in one side of the guide-case 20 for engaging opposite edges of the belt 3, as best seen in Fig. 3. This guide-box 20 is of sufficient length to permit the shift-bar 21 to be moved from a position in front of the pulley to a position in line with the rollers 12, so that the belt may readily be shifted from the pulley to the belt-hanger, and vice versa.

The means for automatically drawing the belt-shifter bar 21 in one direction to shift the belt from the pulley 2 onto the rollers 12 preferably consists of a coil-spring 24, arranged within the box-guide 20, and shift-bar 21, and having one end anchored to a pin 25 on one end of the box-guide 20, and its other end is secured to a pin or shoulder 26, which is secured to the shift-bar 21, the spring being tensioned, so as to draw the shift-bar toward the anchor 25. This shift-bar 21 is moved in the opposite direction manually by means of a flexible wire or cable 27, having a finger-ring 28 at one end, and its other end is passed over an idler 29 on the free end of the tubular box 20 and attached to the pin or shoulder 26. It will now be seen that by drawing down upon the cord or cable 27, which is located at one side of the belt, the shift-bar 21 is drawn in one direction against the action of the spring 24 for shifting the belt from the rollers 12 onto the pulley 2 and that the spring 24 operates to draw the shift-bar in the opposite direction for shifting the belt from the pulley 2 onto the rollers 12. This is a particularly simple means for shifting the belt back and forth and obviates any liability of accidentally shifting the belt from the fixed hanger to the pulley.

The means for holding the shift-bar in position to hold the belt onto the pulley consists of a gravity pawl or arm 30, which is pivoted at 31 to the top of the tubular box 20 and has its depending portion riding in a suitable slot 32 in the adjacent side of the tubular box 20, so as to fall in behind the end of the shift-bar 21 nearest the anchor 25 when said shift-bar is drawn to its extreme outer position, as seen in Fig. 3, thereby holding the shift-bar against the action of the spring 24.

When it is desired to shift the belt from the pulley to the rollers 12 of the stationary hanger, it is simply necessary to trip the pawl 30 by rocking it backward by hand, whereupon the spring 24 automatically draws the shift-bar 21 into registration with the rollers 12, it being understood that this lever 30 is always accessible when needed, for the reason that the belt is always on the pulley when it is necessary to trip the pawl, which latter is located at the inner side of the pulley and automatically falls in behind the shift-bar when pulled out.

What I claim is—

1. A belt-shifting mechanism comprising a fixed hanger and rollers thereon for receiving the belt, a tubular box on the hanger extending across the face of the pulley, a shift-bar guided in the box and provided with belt-shifting arms, a spring forcing the shift-bar in one direction, a detent holding the shift-bar against the action of the spring, said detent being movable to release the shift-bar and a pendent cord operable manually to move the shift-bar against the action of the spring.

2. In a belt-shifting mechanism, the combination with a pulley, a fixed belt-hanger at one end of the pulley and provided with a series of belt-receiving rollers, fixed supports for the belt-hanger, said belt-hanger being provided with a laterally-extending arm across the face of the pulley, a slidable shift-bar mounted on said arm and provided with belt-engaging arms, a pendent cord operable manually to draw the shift-bar in one direction, a gravity-pawl mounted on a fixed fulcrum and engaging said shift-bar to hold it in one of its adjusted positions, and a spring for sliding the shift-bar to its other, or opposite position.

3. In combination with a revolving pulley and belt thereon, a belt-hanger located at one side of the pulley and provided with a series of rollers concentric with the axis of the pulley, an arm fixed to the hanger and extending across the face of the pulley, a shift-bar movable on said arm and provided with belt-engaging fingers, a spring having one end connected to the hanger and its other end connected to the shift-bar and operating to shift said bar to move the belt from the pulley to the rollers of the hanger, a flexible pendent cable operable manually and connected to the shift-bar to move it against the action of the spring and a movable detent for holding the shift-bar in the latter position.

4. In combination with a revolving pulley, and belt thereon, a fixed semicircular segment located at one end of the pulley, studs secured to said segment and projecting toward the pulley parallel with its axis, rollers on said studs, an arm rigid with one end of the segment and extending across the face of the pulley, a shift-bar slidable on said arm and provided with belt-engaging arms, a spring for forcing said shift-bar toward the segment, and means for forcing said bar in the opposite direction.

5. In combination with a pulley and belt thereon, a fixed semicircular segment located at one end of the pulley, supporting means for said segment, rollers mounted upon the segment between it and the pulley, and parallel with the axis of the pulley, an arm rigid on one end of the segment and projecting across the face of the pulley, a belt-shifting bar slidable on said arm, a spring for forcing said bar in one direction, means for shifting the bar in the opposite direction and a movable detent for engaging the bar and holding it against the action of the spring.

In witness whereof I have hereunto set my hand this 5th day of June, 1905.

ISAAC S. NEWTON.

Witnesses:
H. E. CHASE,
MILDRED M. NOTT.